(12) United States Patent
Kume et al.

(10) Patent No.: US 9,285,490 B2
(45) Date of Patent: Mar. 15, 2016

(54) RADIATION DETECTION APPARATUS

(71) Applicant: KABUSHIKI KAISHA TOSHIBA, Minato-Ku (JP)

(72) Inventors: Naoto Kume, Yokohama (JP); Toru Onodera, Yokohama (JP); Yoshinori Satoh, Yokohama (JP); Shunichiro Makino, Yokosuka (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 41 days.

(21) Appl. No.: 14/348,300

(22) PCT Filed: Sep. 28, 2012

(86) PCT No.: PCT/JP2012/075222
§ 371 (c)(1),
(2) Date: Mar. 28, 2014

(87) PCT Pub. No.: WO2013/047825
PCT Pub. Date: Apr. 4, 2013

(65) Prior Publication Data
US 2014/0252244 A1  Sep. 11, 2014

(30) Foreign Application Priority Data

Sep. 30, 2011  (JP) ................ 2011-215922

(51) Int. Cl.
*G01T 7/00* (2006.01)
*G21F 3/00* (2006.01)
(Continued)

(52) U.S. Cl.
CPC ... *G01T 7/00* (2013.01); *G21F 3/00* (2013.01); *G01T 1/169* (2013.01); *G01T 1/1642* (2013.01)

(58) Field of Classification Search
CPC ................ G01T 7/00; G01T 1/16; G21F 3/00
See application file for complete search history.

(56) References Cited

U.S. PATENT DOCUMENTS 3,489,902 A  1/1970  Hick
3,878,373 A  4/1975  Blum
(Continued)

FOREIGN PATENT DOCUMENTS

JP  5 500415  1/1993
JP  2002 214353  7/2002
(Continued)

OTHER PUBLICATIONS

International Preliminary Report on Patentability issued Apr. 1, 2014 in PCT/JP2012/075222 filed on Sep. 28, 2012 (English translation only).
Written Opinion issued Oct. 23, 2012 in PCT/JP2012/075222 filed on Sep. 28, 2012 (English translation only).
International Search Report Issued Oct. 23, 2012 in PCT/JP12/075222 Filed Sep. 28, 2012.
(Continued)

*Primary Examiner* — David Porta
*Assistant Examiner* — Mindy Vu
(74) *Attorney, Agent, or Firm* — Oblon, McClelland, Maier & Neustadt, L.L.P (57) ABSTRACT

A radiation detection apparatus is provided with a detection element group which includes a plurality of detection elements arranged on a support substrate, a shield body of which a pinhole is formed on front surface and a slit is formed on back surface, the shield body putting the detection element group therein, a signal processing substrate which processes a detection signal respectively detected by each detection element, is provided outside of the shield body, and has a dimension being larger than a width of the slit, and a relay substrate which goes through the slit and connects each detection element with the signal processing substrate.

9 Claims, 11 Drawing Sheets

(51) Int. Cl.
 *G01T 1/16* (2006.01)
 *G01T 1/169* (2006.01)
 *G01T 1/164* (2006.01)

(56) References Cited

U.S. PATENT DOCUMENTS 4,797,701 A * 1/1989 Lannes .................. 396/322
4,959,547 A 9/1990 Carroll et al.
5,036,201 A 7/1991 Carroll et al.
5,204,533 A * 4/1993 Simonet ............ 250/361 R

FOREIGN PATENT DOCUMENTS

| JP | 2006 208010 | 8/2006 |
| WO | WO 90/15346 A2 | 12/1990 |
| WO | WO 00/33105 A2 | 6/2000 |
| WO | WO 02/093195 A2 | 11/2002 |

OTHER PUBLICATIONS

Partial Supplementary Search Report issued May 29, 2015 in European Patent Application No. 12835726.6.

* cited by examiner

ID APPARATUS

TECHNICAL FIELD

The present invention relates to an apparatus that detects radiation such as gamma ray (γ-ray), X-ray or the like.

BACKGROUND ART

Although it is well known that radiation such as gamma ray (γ-ray), X-ray or the like (hereinafter, which will be simply referred as "gamma ray") makes large influence on human body, humans cannot see radiation. For example, it is important for operators working in a nuclear electricity generation plant or citizens living in a neighborhood of the nuclear electricity generation plant to reduce radiation exposure.

An apparatus which has portability and is used at a site or the like, the apparatus for determining a radiation source is disclosed in patent documents 1 and 2. The patent document 1 discloses a gamma ray radioactivity distribution imaging apparatus which includes arranged gamma ray detectors and a collimator. The patent document 2 discloses an independent type gamma ray camera which is a portable and self-powered type gamma ray camera for using during an operation.

PRIOR ART DOCUMENT

Patent Document

Patent Document 1: Publication of (Unexamined) Patent Application No. 2005-49136
Patent Document 2: Published Japanese Translation of PCT International Publication for Patent Application No. 2009-521694

DESCRIPTION OF INVENTION

Problems to be Solved by Invention

The radiation detection apparatus that determines a location of radiation source is configured by including a plurality of radiation detectors which is arranged in two-dimensional arrangement such as a matrix or the like, and a collimator. The collimator is arranged in front of the radiation detectors, and thereby limits incoming direction of radiation and allows only radiation which propagates in intended direction to go into the radiation detection apparatus.

However, in a case where the radiation detection apparatus is used at a place where radiation dose is high such as indoor of nuclear power plant, outdoor being located near nuclear power plant, or the like, radiation comes into the radiation detection apparatus from all directions of a radiation detection apparatus circumference. Thus, when the radiation detection apparatus detects radiation, signal-to-noise ratio (S/N) decreases because of increasing back ground noise.

Since generation and detection, of gamma ray are stochastic phenomenon, a statistic error becomes large when S/N is low. The enlargement of the statistic error leads to reduction of a spatial resolution as to determining position of gamma radiation source.

In response, for the sake of eliminating background noise of the radiation detection apparatus circumference, the radiation detection apparatus is enclosed with material which has large density, such as lead (Pb), tungsten (W) or the like. However, if the radiation detection apparatus is enclosed with material which has large density, portability of the radiation detection apparatus decreases because of increasing weight of the radiation detection apparatus.

The present invention has been made in consideration of the circumstances mentioned above, and an object thereof is to provide a radiation detection apparatus that can improve signal to noise (S/N) ratio and spatial resolution without decreasing portability.

Means for solving Problem

In order to solve the problem in the conventional art mentioned above, an embodiment of the present invention provides a radiation detection apparatus comprising: a detection element group which includes a plurality of a detection element arranged on a support substrate; a shield body of which a pinhole is formed on a front surface and a slit unit is formed on a back surface, the shield body putting the detection element group therein; a signal processing substrate which processes a detection signal respectively detected by each detection element, is provided outside of the shield body, and has a dimension being larger than a width of the slit unit; and a relay substrate which goes through the slit and connects each detection element with the signal processing substrate.

Effect of Invention

The radiation detection apparatus according to the present invention can realize an improvement of signal to noise (S/N) ratio and spatial resolution without impairing portability.

EMBODIMENT FOR CARRYING OUT THE INVENTION

First Embodiment

A first embodiment of a radiation detection apparatus according to the present invention will be described with reference to the accompanying drawings.

Figure 1:
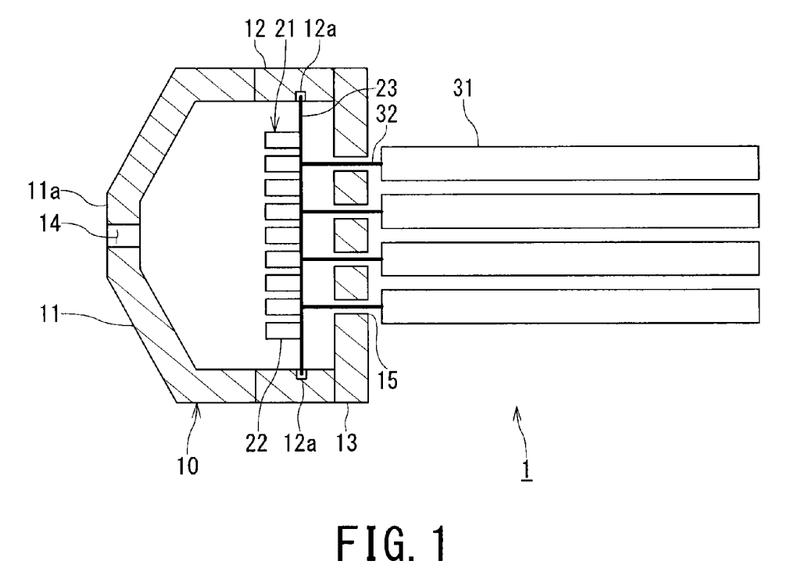
FIG. 1 is a cross-sectional view of a radiation detection apparatus according to a first embodiment.

FIG. 1 is a cross-sectional view of a radiation detection apparatus 1 as the first embodiment of the radiation detection apparatus according to the present invention.

Figure 2:
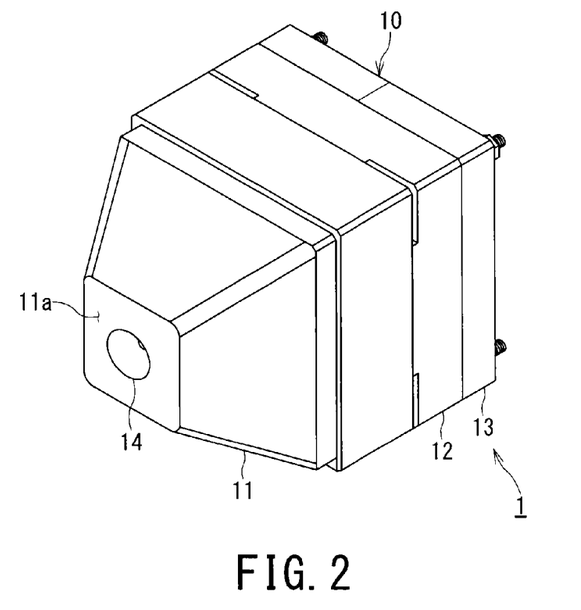
FIG. 2 is an appearance oblique perspective view illustrating a front side of a shield body of the radiation detection apparatus according to the first embodiment.

FIG. 2 is an appearance oblique perspective view illustrating a front side of a shield body 10 included in the radiation detection apparatus 1.

Figure 3:
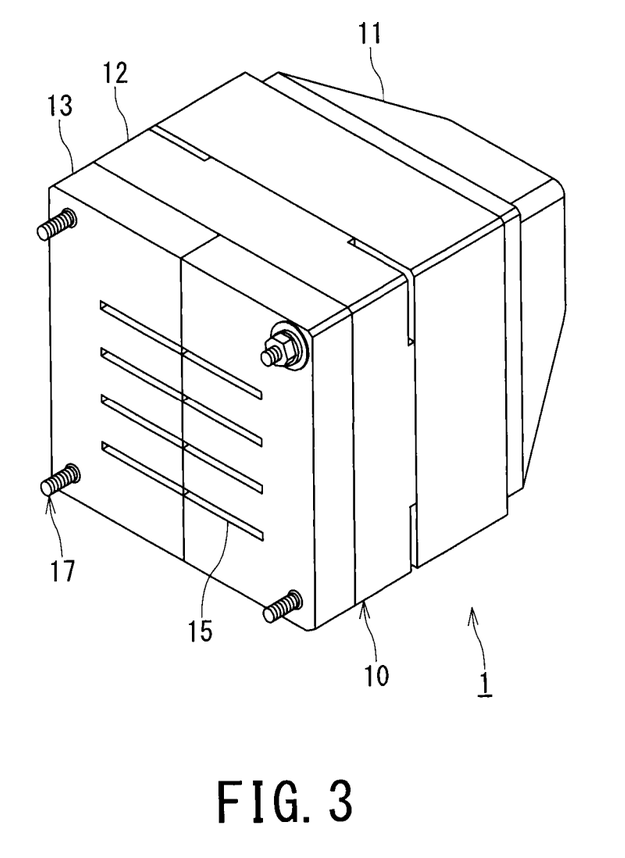
FIG. 3 is an appearance oblique perspective view illustrating a back side of a shield body of the radiation detection apparatus according to the first embodiment.

FIG. 3 is an appearance oblique perspective view illustrating a back side of the shield body 10 included in the radiation detection apparatus 1.

Incidentally, in each embodiment, an example in a case where a radiation detected by the radiation detection apparatus 1 is gamma ray (γ-ray) will be explained. Further, a side on which a pinhole 14 is formed is defined as front side (front surface side) of the radiation detection apparatus 1, and a side on which a slit 15 is formed is defined as back (rear) side (back surface side) of the radiation detection apparatus 1.

The radiation detection apparatus 1 mainly includes detection element group 21, the shield body 10, a signal processing substrate 31, and a relay substrate 32.

The detection element group 21 includes a plurality of detection elements 22 which is arranged in a matrix on 2D (two-dimensional) plane. For example, the detection elements 22 are arranged in a quadrate. The detection element 22 is an element such as a semiconductor or a scintillator, which generates charge (charged particle) or light when gamma ray comes into the detection element 22.

The shield body 10 puts the detection element group 21 therein and includes a pinhole collimator unit 11, a lateral shield unit 12, and a slit unit 13.

The pinhole collimator unit (pinhole unit) 11 includes a component being shaped like a truncated pyramid, and formed of front surface of the shield body 10, i.e., a front side from the detection element group 21. In the pinhole unit 11, the pinhole 14 is formed as a circular or rectangular pinhole hole so that gamma ray only detected in the detection element 22 passes through the pinhole 14. The pinhole 14 is formed in a center portion neighborhood (vertex portion) of the front surface 11a of which a shape is a rectangle or rectangle-like. In a case where shape of the pinhole 14 is circle, even if hard substance such as tungsten or the like is used as a material of the pinhole 14, the pinhole 14 can be formed.

In a case where the pinhole 14 is formed as the rectangular pinhole, an area of the pinhole 14 can be reduced even if the rectangular pinhole has same measurement eyesight as another shaped pinhole. Thus, since the pinhole 14 as the rectangular pinhole can reduce a radiation dose of gamma ray which passes through the pinhole 14, a background noise caused by unnecessary gamma ray coming from eyesight can be reduced. Further, in a case where the pinhole 14 is formed as the rectangular pinhole, since measurement range in each of the detection element 22 narrows, the spatial resolution improvement can be estimated.

Figure 4:
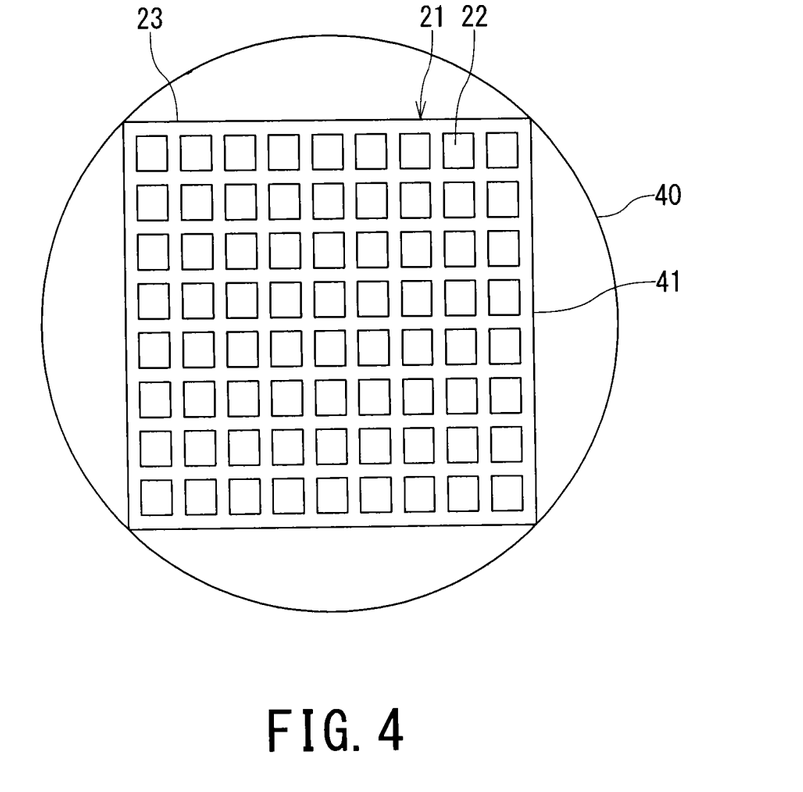
FIG. 4 is an explanatory view for comparing a shape of a pinhole.

Here, FIG. 4 is an explanatory view for comparing a shape of the pinhole 14.

Specifically, when the eyesight is a circular eyesight 40, in a case where the detection element group 21 arranged in quadrate is used as detection means, it is necessary that an eyesight corresponding to circumcircle of the quadrate. Meanwhile, when the eyesight is a rectangular eyesight 41, the rectangular eyesight 41 can preferably correspond to an outline of the detection element group 21.

Incidentally, the radiation detection apparatus 1 in a case where the detection element 22 is arranged so that the shape of the detection element group 21 is a circle can obtain the same effect as that of the radiation detection apparatus 1 in a case where the outline of the detection element group 21 and the pinhole 14 are shaped as rectangle. In essence, the shape of the pinhole 14 may be similar shape to the outline of the detection element group 21.

The lateral shield unit 12 is shaped as rectangle of which both ends are opened. The lateral shield unit 12 encloses side surface of the detection element group 21 except the detection surface and the back surface. For example, the support substrate 23 of the detection element group 21 is holding by a notch portion 12a. Since the support substrate 23 is holding, the lateral shield unit 12 fixes the detection element group 21 at the support substrate 23. It is preferable that an inner dimension of the lateral shield unit 12 is as small as possible unless the detection element group 21 contacts with the lateral shield unit 12.

The slit unit 13 is a plate-like member having a plurality of the slits 15, and formed of the back surface of the shield body 10. The slit unit 13 is divided into, for example, two components with respect to direction of the slit 15. As long as the slit 15 can pass through a relay substrate 32 hereunder described, it is preferable that a width of the slit 15 is as small as possible.

As illustrated in FIG. 3, the shield body 10 is fixed by attachment means 17. The attachment means 17 can be applied with, for example, screw shut means such as screw or tap, being made from aluminum or stainless. The shield body 10 is screwed shut in a direction from front surface toward back surface or from back surface toward front surface.

Figure 5:
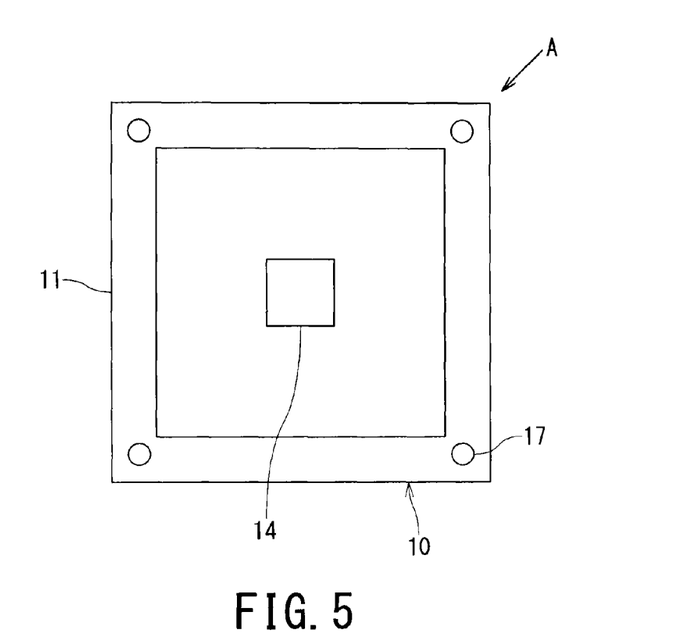
FIG. 5 is a front view of the shield body in case of being screwed shut from the front side.

Herein, FIG. 5 is a front view of the shield body 10 in a case of being screwed shut from the front side. For the sake of accurate measurement by means of the detection element 22, it is necessary to detach the pinhole unit 11 from the shield body 10 before measurement and calibrate the detection elements 22 by irradiating gamma ray of which radiation dose is known and uniform to each detection element 22. As illustrated in FIG. 5, because of being screwed shut from the front side, the radiation detection apparatus 1 can easily detach only the pinhole unit 11 from the shield body 10, and easily perform a calibration of the detection element 22.

It is preferable to provide attachment means 17 by means of screw or tap at a position where a shield effect of the shield body 10 can be maintained. For example, a passage distance of gamma ray "A" illustrated in FIG. 5 becomes about 10 [mm]×√2=14 [mm] in a case where a thickness of the shield body 10 is 10 [mm]. Here, the gamma ray "A" illustrated in FIG. 5 comes into the radiation detection apparatus 1 by coming from diagonal direction to four corners of the shield body 10. If the screw used as the attachment means 17 is M4 (which means screw size in accordance with Japanese Industrial Standards), sufficient shield effect can be maintained.

Incidentally, for the sake of avoiding a change of shield effect caused by being screwed to the shield body 10, the same material as the shield body 10 may be used as a material of the screw. Further, in consideration of the change of shield effect, the number (or thickness) of the shield body 10 may be increased.

Each thickness in each portion of the shield body 10 is set in accordance with energy of radiation as detection object (which means "object to be detected" before the radiation is detected and "detected objection" after the radiation is detected). The shield body 10 is formed by using material of which density is large, such as lead (Pb), tungsten (W), gold (Au) or the like. For example, there is a case where detection object is gamma ray of which derivation is cesium-137 ($^{137}$Cs) and energy is 660 kilo-electron volts [keV]. In this case, if the shield body 10 is formed by using tungsten, preferable thickness of the shield body 10 becomes approximate 10 millimeters [mm]. Further, if the shield body 10 is formed by using lead, preferable thickness of the shield body 10 becomes approximate 20 millimeters [mm].

As illustrated in FIG. 1, the signal processing substrate 31 is connected with the detection element 22 through the relay substrate 32, adjusts power source voltage, and processes detection signal output from the detection element 22. A dimension of the signal processing substrate 31 is larger than that (width) of the slit 15 in the slit unit 13.

The relay substrate 32 goes through the slit 15, and is connected with the detection element 22 (the support substrate 23) and the signal processing substrate 31 through connector. The relay substrate 32 is, for example, a flexible print substrate, and has thickness being smaller than the width of the slit 15. The material of the relay substrate 32 can be arbitrarily chosen.

Next, an operation of the radiation detection apparatus 1 according to the first embodiment will be explained.

In a case where a user uses the radiation detection apparatus 1 for detecting gamma ray, the radiation detection apparatus 1 is put at a place to be detected. For example, the gamma radiation irradiated from a hotspot at which many gamma radiation source presents goes through the pinhole 14 and comes into the detection elements 22.

Each detection element 22 into which gamma ray comes generates charge or light in accordance with energy of gamma ray. The detection element 22 converts from generated charge or light into a voltage signal, and outputs the voltage signal to the signal processing substrate 31 via the relay substrate 32. The signal processing substrate 31 counts the number of gamma ray detected by performing determined signal processing. Incidentally, required calculator or display device is arranged in the latter part of the signal processing substrate 31.

Here, in the detection element group 21, there is possibility being come into gamma ray from the side surface and the back surface in addition to gamma ray irradiated from the front surface and passed through the pinhole 14. The gamma ray irradiated from the side surface and the back surface becomes noise of the detection signal and therefore becomes interruption of accurate detection.

Meanwhile, in the radiation detection apparatus 1 according to the first embodiment, the side and back surfaces of the detection element group 21 are enclosed with the shield body 10 in addition to the front surface of the detection element group 21. Since gamma ray irradiated from all direction is blocked by the shield body 10 or passed through the shield body 10, an intensity of the gamma ray decreases. Due to decreasing the gamma ray intensity, a noise of signal measured by the detection element 22 can be reduced.

Further, if gamma ray passing through the slit 15 of the slit unit 13, being formed the back surface of the shield body 10 and goes to the detection element 22, light line in accordance with the width of the slit 15 are observed. Meanwhile, in the radiation detection apparatus 1 according to the first embodiment, because the signal processing substrate 31 being larger than the width of the slit 15 is further arranged in the back surface of the slit unit 13, gamma ray which may come from the back surface of the shield body 10 can be shielded. That is, gamma ray can be shielded without providing with new additional configuration for shielding gamma ray which may come from the back surface.

In general, a radiation shield ability of gamma ray depends on density of substance. In a case where the slit unit 13 is formed of tungsten (density is 5.4 gram per cubic meter [g/cm^3]) of which thickness is approximate 10 mm, if the signal processing substrate 31 is formed of glass epoxy substrate (density is 1.85 gram per cubic meter [g/cm^3]) of which length is approximate 30 mm, the signal processing substrate 31 can obtain a similar radiation shield ability as that of the slit unit 13. Thus, the radiation detection apparatus 1 prevents light line corresponding to gamma ray entering from the slit 15 from being measured.

In the first embodiment as described above, since the shield body 10 shields (blocks) the circumference of the detection element group 21, the radiation detection apparatus 1 which is lightweight and has portability can be realized without needing a member for shielding gamma ray, being more than necessity.

While the radiation detection apparatus 1 reduces own weight, the radiation detection apparatus 1 has sufficient radiation shield ability. Therefore, in case of determining a position of radiation source, even if the radiation detection apparatus 1 is used under an environment that presents a number of background noises, the radiation detection apparatus 1 can precisely determine the position of radiation source.

Further, in the radiation detection apparatus 1, since shape of the pinhole 14 is set in accordance with arrangement of the detection element group 21, the radiation detection apparatus 1 can increase spatial resolution.

Second Embodiment

A second embodiment of a radiation detection apparatus according to the present invention will be described with reference to the accompanying drawings.

Figure 6:
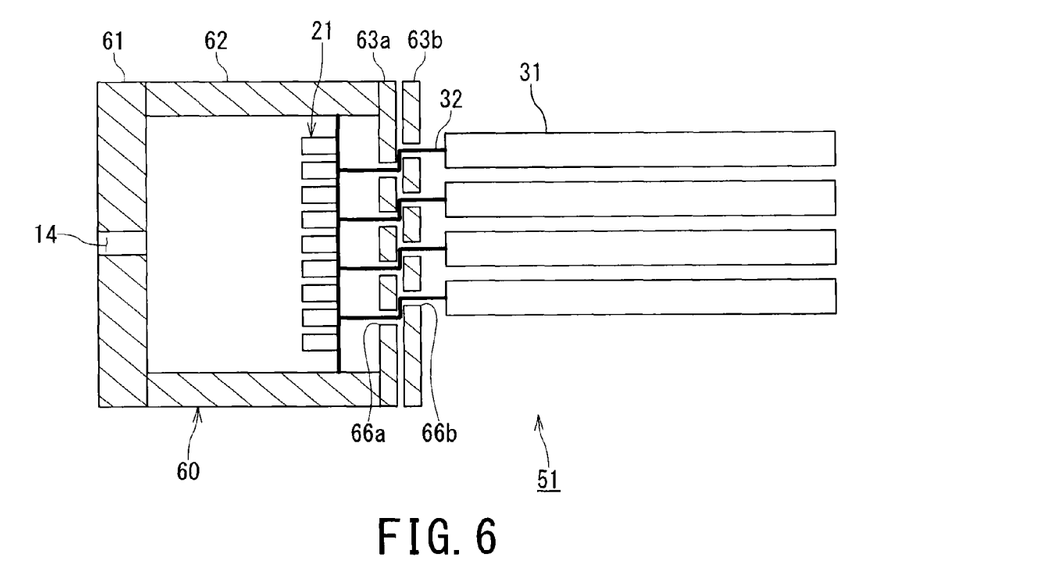
FIG. 6 is a cross-sectional view of a radiation detection apparatus according to a second embodiment.

FIG. 6 is a cross-sectional view of a radiation detection apparatus 51 as the second embodiment of the radiation detection apparatus according to the present invention.

Figure 7:
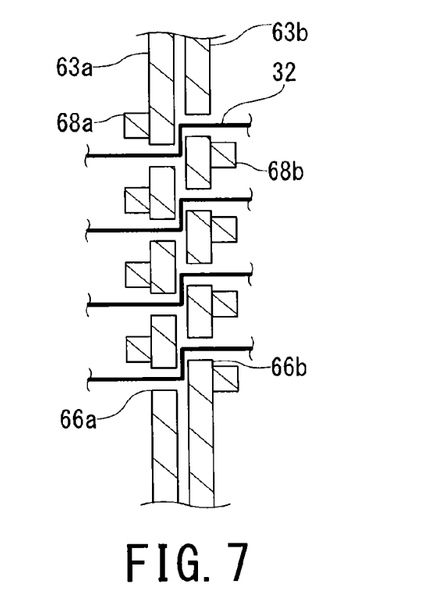
FIG. 7 is an enlargement view illustrating a part of an inner slit unit and an outer slit unit, included in the radiation detection apparatus illustrated in FIG. 6.

FIG. 7 is an enlargement view illustrating a part of an inner slit unit 63a and an outer slit unit 63b, included in the radiation detection apparatus 51 illustrated in FIG. 6.

The different point between the radiation detection apparatus 51 according to the second embodiment and the radiation detection apparatus 1 according to the first embodiment is that the number of the slit units (the inner slit unit 63a and the outer slit unit 63b) of a shield body 60 is equal to two or more. In the second embodiment, it is noted that the same reference numerals or characters in the radiation detection apparatus 51 are assigned to the same or similar components and parts as those in the radiation detection apparatus 1, and the duplicated description thereof is omitted.

The radiation detection apparatus 51 mainly includes the detection element group 21, the shield body 60, the signal processing substrate 31, and the relay substrate 32.

The shield body 60 includes a pinhole unit 61, a lateral shield unit 62, and an inner slit unit 63a and an outer unit 63b.

The pinhole unit 61 is plate-like and provided with the pinhole 14 at an approximate center portion thereof.

The inner slit unit 63a is arranged at the back surface of the shield body 60 and close behind the lateral shield unit 62 (back surface side). The outer slit unit 63b is arranged at the back surface of the shield body 60 and close behind the inner slit unit 63a (back surface side). The inner slit unit 63a and the outer unit 63b are tightly fixed in a state where the relay substrate 32 is held between the inner slit unit 63a and the outer unit 63b.

A plurality of the inner slits 66a is formed in the inner slit unit 63a. A plurality of the outer slits 66b is formed in the outer slit unit 63b. The inner slit 66a and the outer slit 66b are formed so that the relay substrate 32 becomes crank-shaped in a thickness direction of the inner slit unit 63a and the outer slit unit 63. Further, each inner slit 66a is formed so as to overlap with each outer slit 66b. A thickness (i.e., length in the thickness direction) of the inner slit 66a may differ from that of the outer slit 66b.

As illustrated in FIG. 7, the inner slit unit 63a includes a convex portion 68a which projects toward front side of the shield body 60. The convex portion 68a of the inner slit unit 63a is mounted at a position corresponding to a position at which the outer slit 66b of the outer slit unit 63b is formed. It is preferable that the convex portion 68a of the inner slit unit 63a has a length corresponding to a thickness of the outer slit unit 63b. The outer unit 63b includes a convex portion 68b which projects toward back side of the shield body 60. The convex portion 68b of the outer slit unit 63b is mounted at a position corresponding to a position at which the inner slit 66a of the inner slit unit 63a is formed. It is preferable that the convex portion 68b of the outer slit unit 63b has a length corresponding to a thickness of the outer slit unit 63a.

Next, an operation of the radiation detection apparatus 51 according to the second embodiment will be explained.

The radiation detection apparatus 1 according to the first embodiment suppresses gamma ray coming to the detection element 22 by arranging the signal processing substrate 31 being larger than the width of the slit 15 in the back surface of the slit unit 13. However, under an environment that radiation comes into the radiation detection apparatus from all directions, there is a possibility that gamma ray comes into the detection element 22 through a gap between the slit 15 and the signal processing substrate 31 or the relay substrate 32.

Thus, with respect to gamma ray which may come from back side to the detection element 22, the radiation detection apparatus 51 according to the second embodiment can further increases shield effect by being provided with the inner slit unit 63a and the outer slit unit 63b.

Specifically, the inner slit 66a and the outer slit 66b are arranged so that the inner slit 66a does not overlap with the outer slit 66b in the thickness direction of the inner slit 66a and the outer slit 66b. That is, the inner slit 66a and the outer slit 66b are arranged so that the inner slit 66a and the outer slit 66b form crank-shaped slit in the thickness direction of the inner slit 66a and the outer slit 66b. Thus, even if gamma ray passes through the outer slit 66b of the outer slit unit 63b, the inner slit unit 63a is provided in the front side of the outer slit unit 63b and thereby blocks the gamma ray passed through the outer slit 66b. The shield body 60 can prevent the gamma ray passed through the outer slit 66b from passing through the slit units 63a, 63b.

Further, since the convex portions 68a, 68b are respectively mounted in the slit units 63a, 63b, even at the positions at which the slits 66a, 66b are formed, being thin portions in the slit units 63a, 63b, the convex portions 68a, 68b can compensate for thickness decrease in the thin portions of the slit units 63a, 63b. As a result, across whole region of the inner slit unit 63a and the outer slit unit 63b, radiation dose of gamma ray which respectively passes through each slit unit 63a, 63b becomes uniform. Further, across whole region of the inner slit unit 63a and the outer slit unit 63b, each thickness of each 63a, 63b becomes uniform, and becomes a thickness corresponding to total thickness obtained by adding a thickness in a portion which the inner slit 66a is not formed and a thickness in a portion which the outer slit 66b is not formed. Therefore, shield effect of the shield body 60 can be increased.

The radiation detection apparatus 51 according to the second embodiment can shield gamma ray coming from the inner slit 66a and the outer slit 66b to the detection element 22 without depending on length or kind, of the signal processing substrate 31 or the relay substrate 32. The radiation detection apparatus 51 can reduce an influence of background noise and increase S/N.

Third Embodiment

A third embodiment of a radiation detection apparatus according to the present invention will be described with reference to the accompanying drawings.

Figure 8:
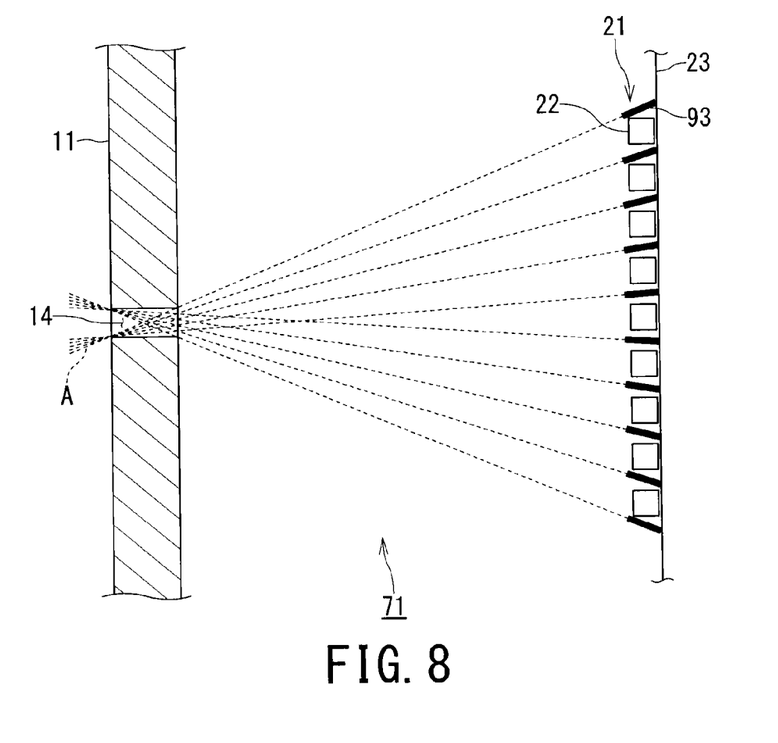
FIG. 8 is a cross-sectional view especially illustrating a detection element group and a pinhole unit, in a radiation detection apparatus according to a third embodiment.

FIG. 8 is a cross-sectional view especially illustrating the detection element group 21 and the pinhole unit 11, in a radiation detection apparatus 71 as the third embodiment of the radiation detection apparatus.

The different point between the radiation detection apparatus 71 according to the third embodiment and the radiation detection apparatuses 1 and 51 according to the first and second embodiments is that a circumference element shield member 93 is provided to the detection element group 21. In the third embodiment, it is noted that the same reference numerals or characters in the radiation detection apparatus 71 are assigned to the same or similar components and parts as those in the radiation detection apparatuses 1 and 51, and the duplicated description thereof is omitted.

The radiation detection apparatus 71 mainly includes the detection element group 21, the shield body 60, the signal processing substrate 31, and the relay substrate 32 (refer to FIG. 1).

The circumference element shield member (shield member) 93 is high density material such as tungsten or the like, and is arranged so as to enclose circumference of each detection element 22. The shield member 93 can set an inclination with respect to the support substrate 23 in accordance with a direction of gamma ray "A" which comes into the detection element 22.

Next, an operation of the radiation detection apparatus 71 according to the third embodiment will be explained.

When gamma ray comes into the detection element 22, it occurs that gamma ray is absorbed or scattered. In case of occurring gamma ray absorption, the radiation detection apparatus 71 can determine a position of gamma ray source. Meanwhile, in case of occurring gamma ray scattering, the radiation detection apparatus 71 is impossible to determine a position of scattered gamma ray source, and therefore causes a reduction of position resolution.

Thus, the shield member 93 is provided between the detection elements 22. Since the shield member 93 shields gamma ray scattered on the detection element 22, an influence of the scattered gamma ray between the detection elements 22 can be decreased. The lower gamma ray energy becomes, the easier it becomes that a substance absorbs gamma ray. If the shield member 93 is provided between the detection elements 22, the scattered gamma ray between the detection elements 22 can sufficiently be shielded.

Further, since the radiation detection apparatus 71 can reduce influence of gamma ray by being provided with the shield member 93, the radiation detection apparatus 71 can increase the spatial resolution.

Figure 9:
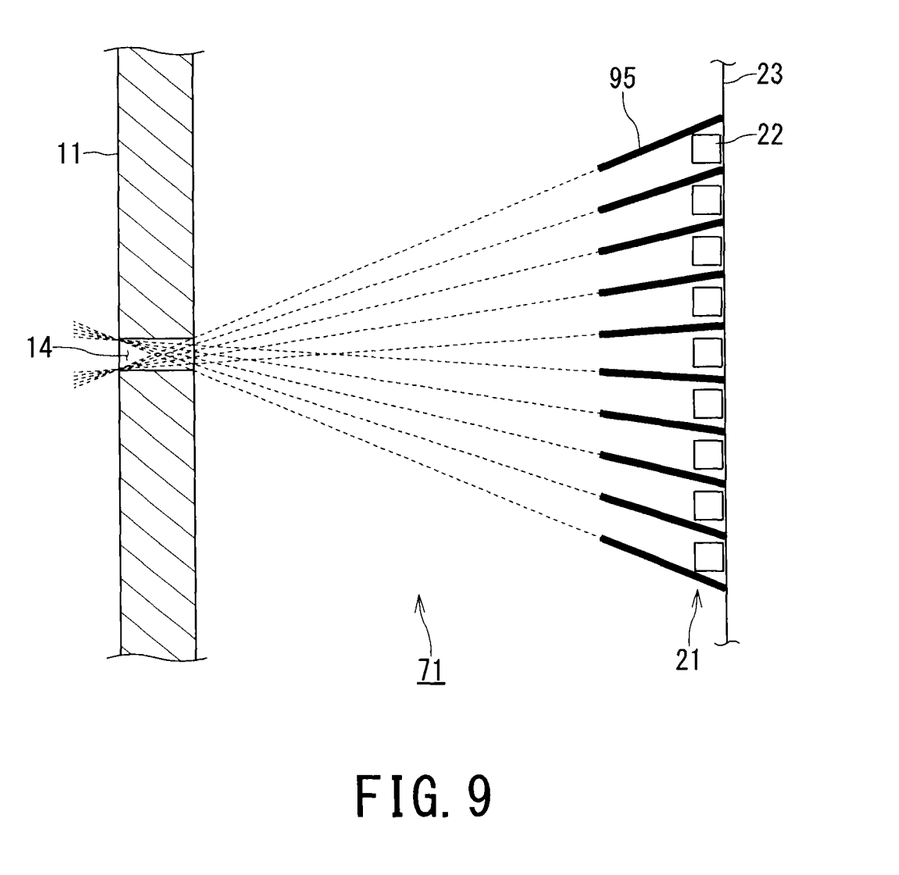
FIG. 9 is a cross-sectional view especially illustrating another example of element circumference shield member in the radiation detection apparatus according to the third embodiment.

It is noted that, as illustrated in FIG. 9, the shield member 93 may be enlarged toward a direction of the pinhole 14 (front direction).

FIG. 9 is a cross-sectional view especially illustrating another example of the element circumference shield member 93 in the radiation detection apparatus according to the third embodiment.

In comparison with the shield member 93 illustrated in FIG. 8, the element circumference shield member (shield member) 95 is enlarged in a direction from the detection element 22 toward the pinhole 14. It is preferable that the shield member 95 is as long as possible unless the shield member 95 interferes with another shield member 95.

Although gamma ray of which radiation dose is not a few goes through the shield body 10, in the radiation detection apparatus 71, the shield member 95 is configured as long as possible, so as to reach to a vicinity of the pinhole 14. Therefore, the radiation detection apparatus 71 can preferably shield gamma ray other than gamma ray which comes from a direction of pinhole 14.

Further, in the radiation detection apparatus 71, since gamma ray which goes through the shield body 10 or is scattered on the detection element 22 can certainly be shielded by the shield member 95. As a result, the radiation detection apparatus 71 can increase spatial resolution.

Fourth Embodiment

A fourth embodiment of a radiation detection apparatus according to the present invention will be described with reference to the accompanying drawings.

Figure 10:
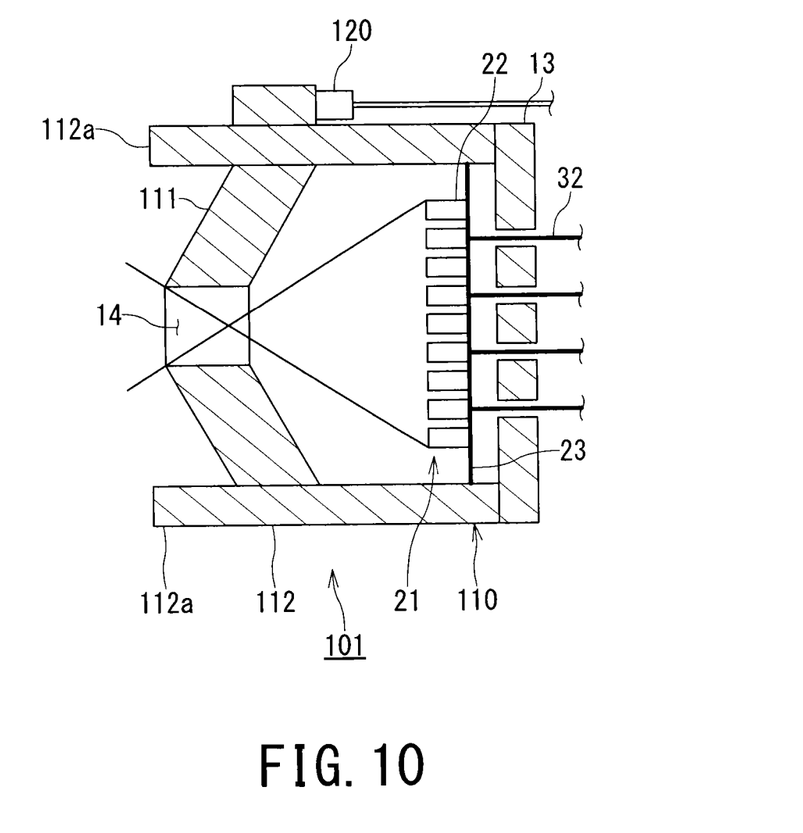
FIG. 10 is a cross-sectional view of the radiation detection apparatus according to a fourth embodiment in a case where a pinhole unit is arranged in a first position.

FIG. 10 is a cross-sectional view of one example of a radiation detection apparatus 101 as the fourth embodiment of radiation detection apparatus according to the present invention in a case where a pinhole unit 111 is arranged in a first position.

Figure 11:
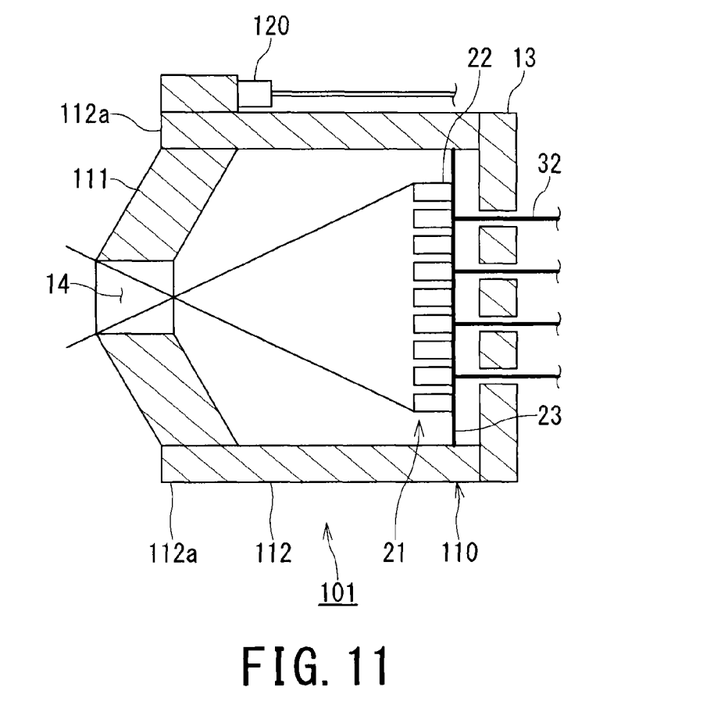
FIG. 11 is a cross-sectional view of the radiation detection apparatus according to the fourth embodiment in a case where the pinhole unit is arranged in a second position.

FIG. 11 is a cross-sectional view of one example of a radiation detection apparatus 101 in a case where the pinhole unit 111 is arranged in a second position.

Figure 12:
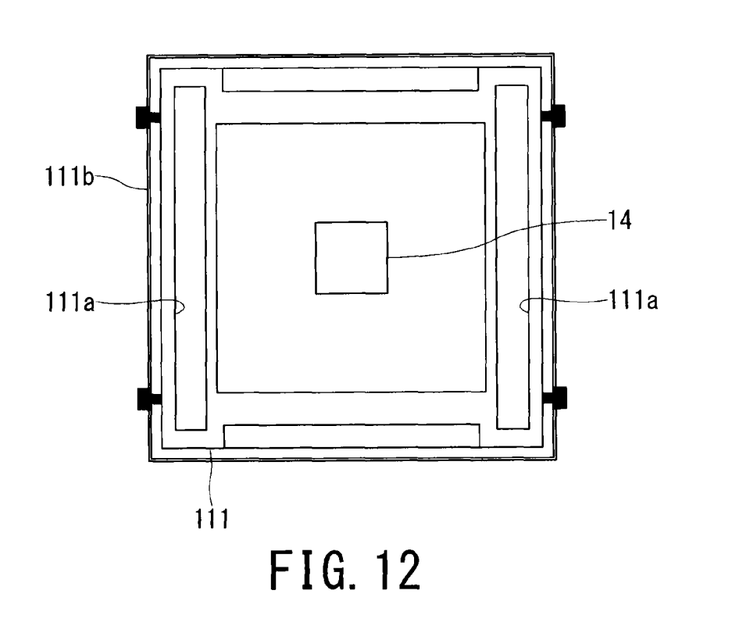
FIG. 12 is a front view of the pinhole unit in the radiation detection apparatus according to the fourth embodiment.

FIG. 12 is a front view of the pinhole unit 111 of the radiation detection apparatus 101.

The different point between the radiation detection apparatus 101 according to the fourth embodiment and the radiation detection apparatuses 1, 51 and 71 according to the first to third embodiments is that the pinhole unit 111 of a shield body 110 is configured so as to move forward and backward. In the fourth embodiment, it is noted that the same reference numerals or characters in the radiation detection apparatuses 101 are assigned to the same or similar components and parts as those in the radiation detection apparatuses 1, 51 and 71, and the duplicated description thereof is omitted.

The radiation detection apparatus 101 mainly includes the detection element group 21, the shield body 110, the signal processing substrate 31 (refer to FIG. 1), and the relay substrate 32.

The shield body 110 includes a pinhole driving unit 120, the, a pinhole unit 111, a lateral shield unit 112, and the slit unit 13.

The pinhole driving unit 120 includes a stepping motor and a controller which controls the motor, connected to the pinhole unit 111. The pinhole driving unit 120 performs an automatic control operation or a manual control operation, and thereby moves the pinhole unit 111 to a predetermined position. As illustrated in FIGS. 10 and 11, the pinhole driving unit 120 moves the pinhole unit 111 in forward-backward direction with respect to the radiation incoming direction. The pinhole driving unit 120 moves the pinhole unit 111 within a range where the pinhole unit 111 does not contact with the detection element group 21.

As illustrated in FIG. 12, the pinhole unit 111 includes a drive opening 111a and a stopper 111b. The drive opening 111a is formed at sides of the pinhole unit 111, facing each other so that the pinhole unit 111 can move (slide) forward and backward with respect to a pair of side walls 112a of the lateral shield unit 112, facing each other. The stopper 111b limits a movement range of the pinhole unit 111 so as not to move an out of range which is predetermined movement range of the pinhole unit 111.

Next, an operation of the radiation detection apparatus 101 according to the fourth embodiment will be explained.

As illustrated in FIG. 10, as a result of moving the pinhole unit 111 by means of the pinhole driving unit 120, if a position of the pinhole unit 111 becomes close to the detection element group 21 in a forward-backward direction, a radiation measurement eyesight is enlarged. Meanwhile, as illustrated in FIG. 11, if the position of the pinhole unit 111 becomes away from the detection element group 21 in the forward-backward direction, the measurement eyesight is narrowed.

If the radiation measurement eyesight is enlarged, although a positional resolution decreases, the number of gamma ray which comes into the radiation detection apparatus 101 increases. If the radiation measurement eyesight is narrowed, although the positional resolution increases, the number of gamma ray which comes into the radiation detection apparatus 101 decreases. The radiation detection apparatus 101 changes the position of the pinhole unit 111 by using the pinhole driving unit 120, and thereby arbitrarily changes spatial resolution and S/N.

In a case where radiation intensity of gamma ray to be measured is weak, the radiation detection apparatus 101 according to the fourth embodiment can increase the number of incoming gamma ray with decrease of spatial resolution. In a case where radiation intensity of gamma ray to be measured is strong, the radiation detection apparatus 101 can increase spatial resolution with decrease of the number of incoming gamma ray. Therefore, in the radiation detection apparatus 101, if user arbitrarily sets spatial resolution and S/N, the radiation detection apparatus 101 can adjust spatial resolution and S/N in accordance with user arbitral set.

Fifth Embodiment

A fifth embodiment of a radiation detection apparatus according to the present invention will be described with reference to the accompanying drawings.

Figure 13:
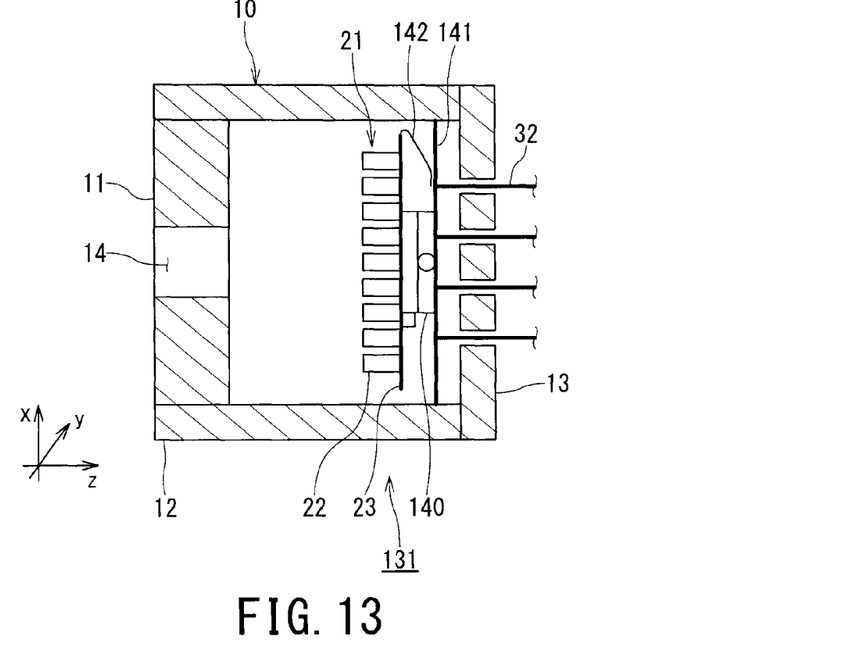
FIG. 13 is a cross-sectional view of a radiation detection apparatus according to a fifth embodiment.

FIG. 13 is a cross-sectional view of a radiation detection apparatus 131 as the fifth embodiment of the radiation detection apparatus according to the present invention.

The different point between the radiation detection apparatus 131 according to the fourth embodiment and the radiation detection apparatuses 1, 51, 71 and 101 according to the first to fourth embodiments is that the radiation detection apparatus 131 includes an element driver unit 140 which two-dimensionally moves the detection element group 21. In the fifth embodiment, it is noted that the same reference numerals or characters in the radiation detection apparatuses 131 are assigned to the same or similar components and parts as those in the radiation detection apparatuses 1, 51, 71 and 101, and the duplicated description thereof is omitted.

The radiation detection apparatus 131 mainly includes the detection element group 21, the shield body 10, the signal processing substrate 31 (refer to FIG. 1), and the element driver unit 140.

The element driver unit 140 includes a stepping motor which drives in x axis direction, a stepping motor which drives in y axis direction, and a controller which remotely controls these motors from outside of these motors. The element driver unit 140 is connected with the support substrate 23 which supports the detection element group 21. On x-y plane perpendicular to z direction (incoming direction of gamma ray) which is a forward-backward direction of the radiation detection apparatus 131, the element driver unit 140 drives a distance being shorter than each of dimensions in x and y directions of each detection element 22, in each of x and y directions.

The element driver unit 140 is fixed at the support substrate 141 which is fixed at the lateral shield unit 12 of the shield body 10. The support substrate 141 is connected with the support substrate 23 thorough electric conductor such as flexible lead 142 or the like. The support substrate 141 is connected with the relay substrate 32 thorough a connecter, and transmits the detection signal output from the detection element 22 to the relay substrate 32.

Next, an operation of the radiation detection apparatus 131 according to the fifth embodiment will be explained.

The element driver unit 140 moves the detection element group 21 within a range which is shorter than a length of the detection element 22 in x and y directions. Each detection element 22 detects gamma ray at a position where the detection element 22 is moved within the range.

Figure 14:
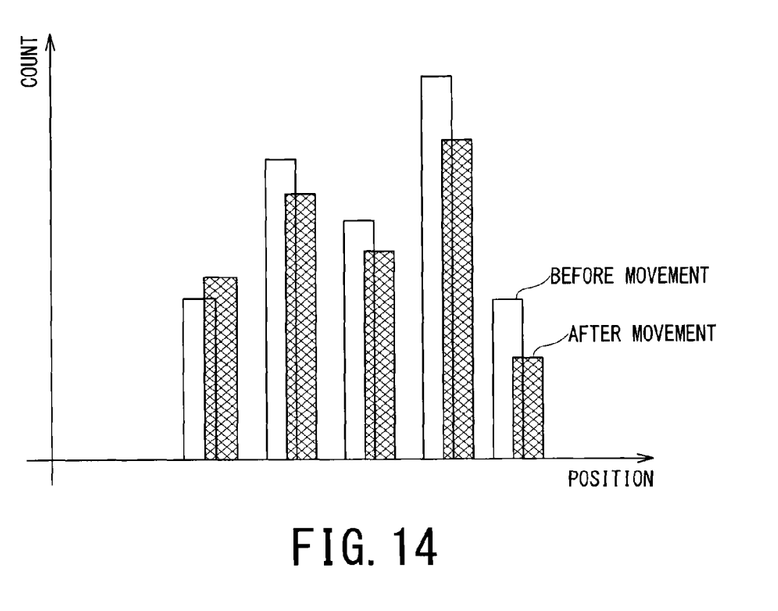
FIG. 14 is a graph representing a relation between radiation detection position and the number of detecting gamma ray before and after movement of the detection element group.

FIG. 14 is a graph representing a relation between radiation detection position and the number of detecting gamma ray before and after movement of the detection element group 21.

In the radiation detection apparatus 131, in a case where the number of the detection element 22 is small, and a gap between adjacent detection elements 22 is large, and so on, there is a case where the radiation detection apparatus 131 is fixed at predetermined point and then successively images. In this case, the radiation detection apparatus 131 may be impossible to obtain sufficient positional resolution. On the other hands, in a case where the element drive unit 140 moves the detection element group 21 in x and y directions, an intensity distribution of data normally obtained by the detection elements 22 can be interpolated. As a result, the radiation detection apparatus 131 can increase positional resolution.

Although some embodiments of the present invention are described, the above-described embodiments are presented as some examples. Accordingly, it is noted that the present invention is not limited to the above-described embodiments. Since the above-described embodiments which are new embodiments can be embodied in various forms other than the specific embodiments described above, various omissions, substitutions, and changes may be made without departing from the spirit and scope of the invention. These embodiments and modifications thereof are included within the sprit and scope of the invention and are included within the scope of the invention as disclosed in the claims and equivalents thereof.

For example, arbitrary shape such as a truncated pyramid, a platy shape, a trapezoidal shape, a triangle shape, and the like may be selected as the shape of the pinhole unit 11. Further, the shape of the pinhole 14 may be either round-like shape or rectangular-like shape.

Figure 15:
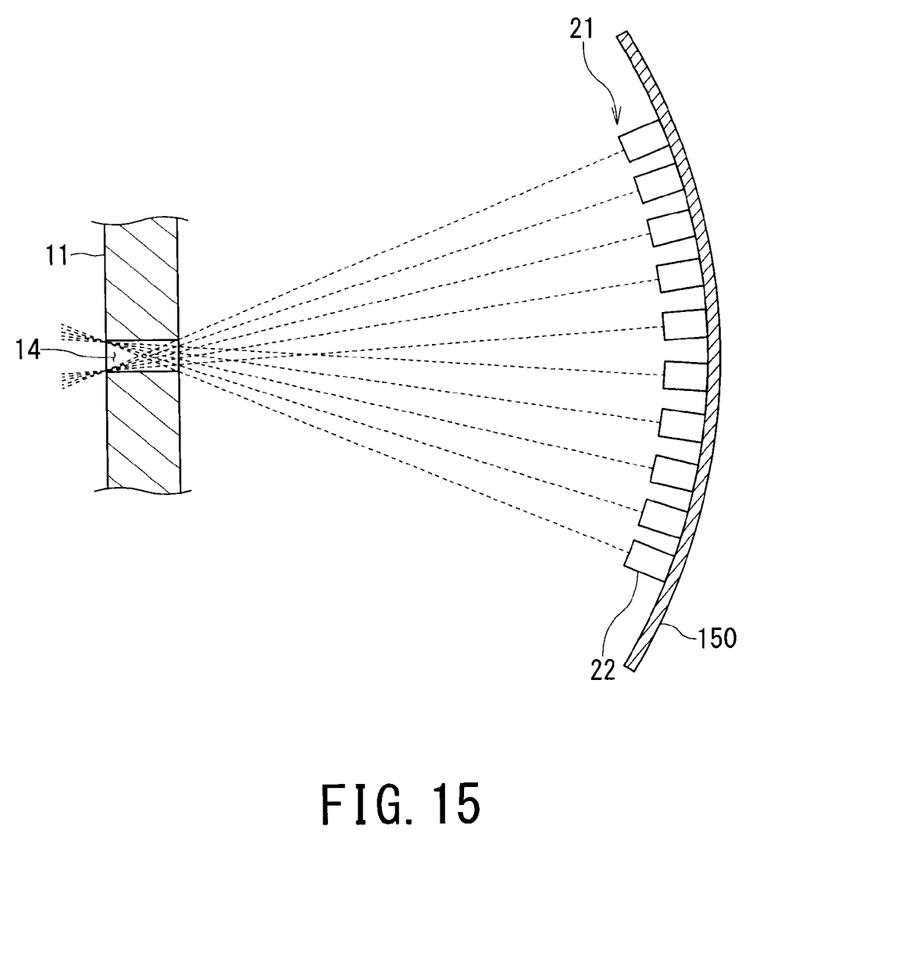
FIG. 15 is an illustration especially illustrating detection elements, a support substrate, and a pinhole unit, included in another example of the radiation detection apparatus.

Further, the detection element group 21 may arrange on a support substrate of which surface is spherical surface-like. FIG. 15 is an illustration especially illustrating detection elements 22, the support substrate 150, and a pinhole unit 11, included in another example of the radiation detection apparatus.

In the support substrate 23 of which surface is a spherical surface, a center of the spherical surface is located at the center portion (which includes the center and a vicinity thereof) of the pinhole 14. The support substrate 23 is arranged so that an acceptance surface of the detection element 22 faces to the center portion of the pinhole 14. Therefore, in comparison with a case where the detection element group 21 is arranged on a vertical surface with respect to incoming direction of gamma ray, the passage distance of gamma ray being come into the radiation detection apparatus elongates, hence the gamma ray can be absorbed with uniformity and high efficiency.

Figure 16:
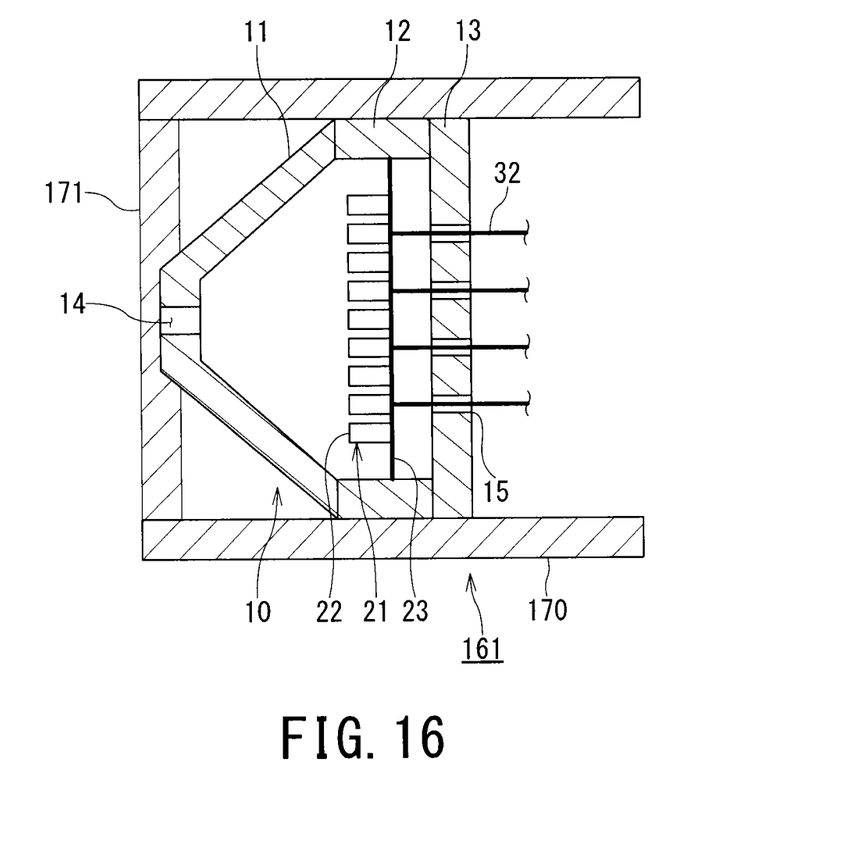
FIG. 16 is a cross-sectional view of the radiation detection apparatus which includes another example of the attachment means of the shield body.

The attachment means 17 of the shield body 10 is not limited to screw and may therefore be attachment means 17 as illustrated in FIG. 16. Here, FIG. 16 is a cross-sectional view of the radiation detection apparatus 161 which includes another example of the attachment means 17 of the shield body 10.

The lateral shield unit 12 and the slit unit 13 are fixed by means of the support member 170. Meanwhile, the pinhole unit 11 is fixed by means of the plate 171 which includes fixture and is arranged on the front face of the support member 170. The support member 170 enables the pinhole unit 11 to be detachably attached to the shield body 10 so as to detach from the shield body 10 if necessary. Therefore, at necessary timing such as a time when the detection element 22 is calibrated, an attachment and a detachment, of the pinhole unit 11 can be easy.

The number of the slit unit 13 may be two or more unless a plurality of the slit units 13 negatively affects on reduction in weight of the radiation detection apparatus or the like.

REFERENCE NUMERALS

1, 51, 71, 101, 131, 161 - - - radiation detection apparatus
10, 60, 110 - - - shield body
11, 61, 111 - - - pinhole collimator unit (pinhole unit)
12, 112 - - - lateral shield unit
13 - - - slit unit
14 - - - pinhole
15 - - - slit
17 - - - attachment means
21 - - - detection element group
22 - - - detection element
23, 150 - - - support substrate
31 - - - signal processing substrate
32 - - - relay substrate
63*a* - - - inner slit unit
63*b* - - - outer slit unit
66*a* - - - inner slit
66*b* - - - outer slit
68*a*, 68*b* - - - convex portion
93, 95 - - - element circumference shield member (shield member)
111*a* - - - drive opening
111*b* - - - stopper
112*a* - - - side wall
120 - - - pinhole driving unit
140 - - - element driving unit
141 - - - connection substrate

The invention claimed is:

1. A radiation detection apparatus comprising:
a detection element group which includes a plurality of a detection element arranged on a support substrate;
a shield body of which a pinhole is formed on a front surface and a slit unit is formed on a back surface, the shield body housing the detection element group therein;
a signal processing substrate which processes a detection signal respectively detected by each detection element, and is provided outside of the shield body and in the back surface of the slit unit, and has a dimension being larger than a width of the slit unit; and
a relay substrate which goes through the slit and connects each detection element with the signal processing substrate.

2. The radiation detection apparatus according to claim 1, wherein the shield body includes an inner slit unit having an inner slit and an outer slit unit having an outer slit as the slit unit, and the inner slit unit and the outer slit unit respectively forms the back surface of the shield body and are arranged so that the inner slit and the outer slit does not overlap each other.

3. The radiation detection apparatus according to claim 2, wherein the inner slit unit includes a convex portion projecting toward the front surface of the shield body, being arranged in a position corresponding to a position on which the slit of the outer slit unit is formed, and the outer slit unit projecting toward the back side of the shield body, being arranged in a position corresponding to a position on which the slit of the inner slit unit is formed.

4. The radiation detection apparatus according to claim 1, further comprising a radiation shield member which is arranged between the detection elements being adjacently located.

5. The radiation detection apparatus according to claim 1, wherein the shield body includes a pinhole unit on which a pinhole is formed, being the front surface of the shield body, and further comprising a pinhole drive unit which moves the pinhole unit back and forth with respect to a radiation incoming direction.

6. The radiation detection apparatus according to claim 1, further comprising an element drive unit which moves the detection element group in a plane perpendicular to a radiation incoming direction.

7. The radiation detection apparatus according to claim 1, wherein an outline of the detection element group is similar shape with a shape of the pinhole.

8. The radiation detection apparatus according to claim 1, wherein the support substrate includes a spherical surface of which a center position is a center portion of the pinhole.

9. The radiation detection apparatus according to claim 1, wherein the shield body includes a pinhole unit on which a pinhole is formed, being the front surface of the shield body, and further comprising attachment means which detachably attach the pinhole unit to the shield body.

* * * * *